Nov. 13, 1934.  H. L. GEBLER  1,980,794
DIRECTION INDICATOR FOR VEHICLES
Filed Oct. 22, 1931
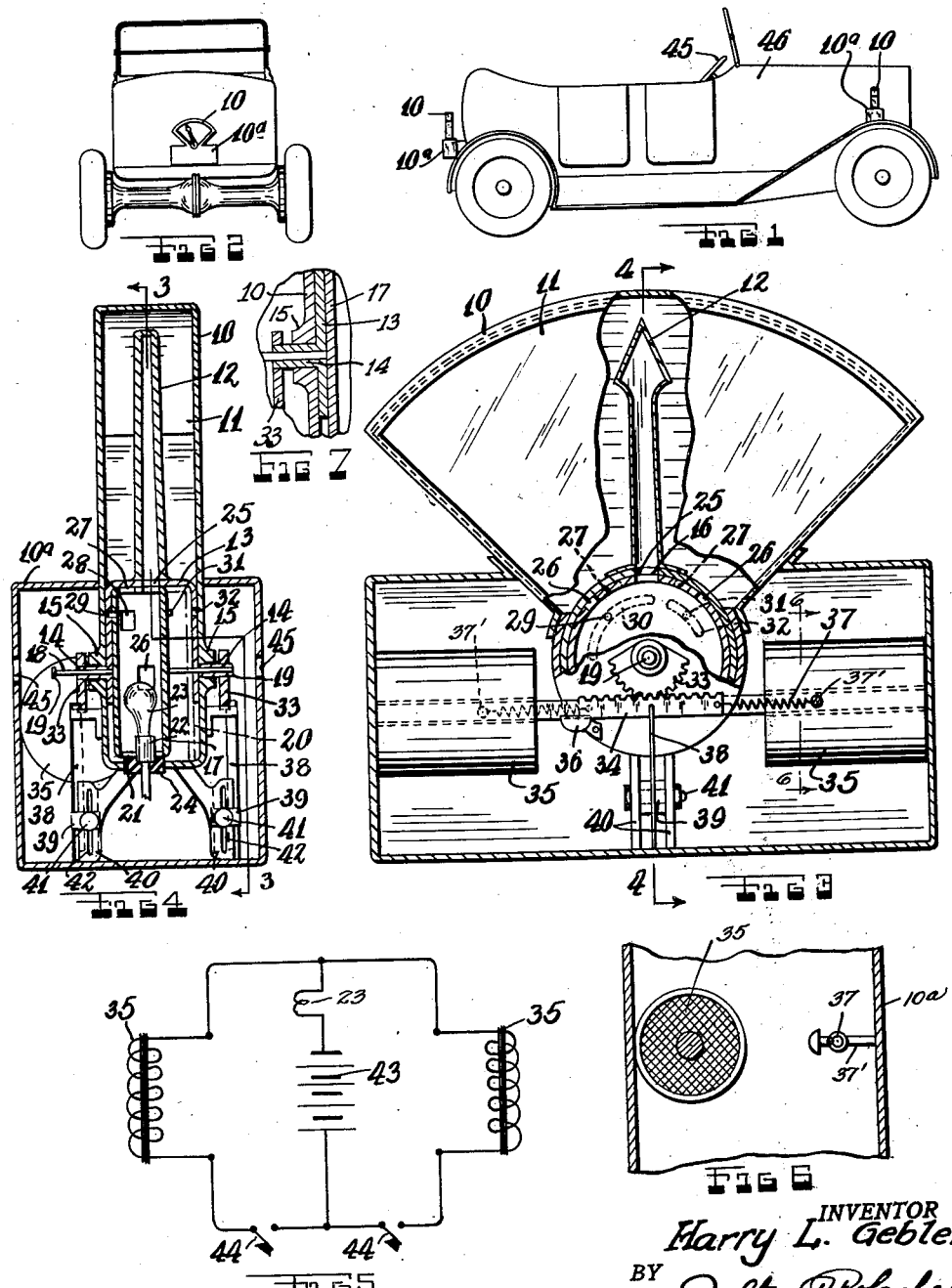
INVENTOR
Harry L. Gebler
BY Zoltan H. Polachek
ATTORNEY Patented Nov. 13, 1934

1,980,794

UNITED STATES PATENT OFFICE 1,980,794

DIRECTION INDICATOR FOR VEHICLES

Harry L. Gebler, New York, N. Y.

Application October 22, 1931, Serial No. 570,276

5 Claims. (Cl. 177—327)

This invention relates to new and useful improvements in a directional indicator for vehicles.

The invention has for an object the construction of a directional indicator which is characterized by a casing having a translucent window, a shutter rotatable in the casing and carrying an arrow, and a drum beneath the shutter for directing illumination of light into the arrow in certain positions.

It is particularly intended that the drum be movable to cause changing of the positions in which the arrow is illuminated.

A further object of this invention is the construction of a device of the class mentioned which is of simple durable construction, dependable in use and efficient in operation, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of an automobile equipped with a directional signal according to this invention.

Fig. 2 is a rear elevational view of Fig. 1.

Fig. 3 is an elevational view of the signal with portions broken away to illustrate interior parts, and is as though taken on the line 3—3 of Fig. 4.

Fig. 4 is a transverse sectional view taken on the line 4—4 of Fig. 3.

Fig. 5 is a schematic wiring diagram of the device.

Fig. 6 is a sectional fragmentary view taken along the line 6—6 of Fig. 3.

Fig. 7 is an enlarged fragmentary view of a portion of Fig. 4.

The directional indicator for vehicles, according to this invention, comprises a casing 10 which has a translucent window 11. This casing is of fan shape for the purpose of efficiently housing an arrow 12 which is capable of swinging from the vertical to either side.

A shell shutter element 13 is rotatively mounted within the casing 10 by reason of having trunnion portions 14 engaging through bosses 15 upon the sides of the casing. This shell shutter element is substantially of cylindrical shape. The arrow 12 is rigidly fixed upon the top of the shell shutter element and is in line with an opening 16 in the shell shutter element so as to allow the passage of light from the bottom of the shell shutter element within the arrow. The arrow is of the type capable of being illuminated to render it visible through the window 11.

A drum shutter element 17 is located within the shell shutter element 13 and is axially slidably mounted. The slidable connection is accomplished by pins 18 from opposite sides of the drum shutter element engaging through the trunnions 14. Heads 19 upon the ends of the pins allow for manual movement to cause the drum to assume different positions within the shutter. The drum, shown in one position by the full lines and dot and dash lines 20 indicate a second position. The drum 17 is limited to slide by reason of a bottom slot 21 which engages the sides of a socket 22 supporting a lamp 23 capable of illuminating the interior of the drum. The socket 22 is fixed upon a plug 24 threadedly engaged at the bottom of the casing 10. The drum shutter element 17 has openings upon one transverse cross section, namely, a top opening 25 and side openings 26. Upon another transverse cross section line the drum shutter element 17 is formed with other openings, namely, top openings 27 and side openings 28. The side openings 28 are spaced at different distances from the top of the drum shutter element than the openings 26.

In the position of the drum shutter element 17 shown in full lines, a pin 29 projects from one side of the drum shutter element and engages within an arcuate slot 30 formed in the shell shutter element 13 so as to limit rotative motion of the shell shutter element to positions in which the arrow 12 may align with one or the other of the openings 26. Another pin 31 projects from the other face of the drum shutter element 17 and is engageable in arcuate openings 32 formed in the shell shutter element 13 and limiting motion of the shell shutter element through a different amplitude to cause the arrow 12 to align with the openings 28. A means is provided for rotating the shell shutter element 13 and comprises arcuate gears 33 fixed upon the trunnions 14 and meshing with racks 34 connected with the cores of solenoids 35. The racks are slidably supported by brackets 36 attached upon the sides of the casing 10. Springs 37 act between the racks and pins 37' which project from the casing 10ª. Flat springs 38 are engaged within the transverse cuts within the racks and pass through slots in adjustable blocks 39. These blocks are supported between the arms 40 of brackets depending from the casing 19. Bolts 41 pass through slots 42 in the brackets and through the blocks 39 and serve to support the blocks at various elevated positions. At different positions of the block, different lengths of the springs 38 will be exposed to action so that the resiliency thereof may be controlled for the proper action of the racks.

The solenoids 35 are operated by a source of power such as a battery 43 controlled by hand switches 44. One or the other of the switches 44 may be closed for energizing one or the other of the solenoids to cause the arrow 12 to pivot in one or the other direction. In addition to the hand switch, automatic switches not shown in the drawing, may be provided for the automatic action of the solenoids controlled from the steering wheel 45 of a vehicle 46. This vehicle is shown equipped with two directional signals, one upon a front center and one upon the rear. A casing 10a is arranged upon the bottom of the casing 10 and serves to house the solenoids and the mechanisms for moving the arrow. The casing 10a is provided with openings 45 aligned with the heads 19 so that the latter elements may be moved for the proper adjustment of the device.

The operation of the device can be traced by assuming it in the position shown in Fig. 4. When one or the other of the solenoids 35 is energized its core will be retracted and correspondingly move the rack 34 which causes pivoting of the arrow 12 as limited by the slot 30. This pivoting of either to the right or the left, depending upon which solenoid is energized and thus the drivers in the vehicles know the intended turning of the vehicle. Both solenoids may be energized simultaneously to cause the arrow 12 to slightly fluctuate and indicate that the car is coming to a stop. To change the amplitude thorugh which the arrow 12 moves, the extended head 19 should be depressed so as to cause the drum shutter element 17 to assume the position indicated by the dot and dash lines 20. In the new position, the pin 31 will engage the arcuate opening 32 to limit the motion of the arrow 12. Simultaneously, the pin 29 disengages from the opening 30. In the new position of the drum the openings 28 will serve to allow the passage of light for the illumination of the arrow 12. The blocks 39 may be adjusted for changing the action of the springs 38 to properly hold the arrow 12 as desired.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A directional signal for vehicles, comprising a casing with a translucent window, a hollow arrow made of translucent material to be internally illuminated and within said casing, a shell shutter element pivotally mounted in said casing and supporting said hollow arrow and having an opening communicating with the interior of said hollow arrow, a drum shutter element within said shell shutter element for cooperation with each other to produce a shutter action and slidably supported coaxially with the axis of pivoting of said shell shutter element and having apertures upon one transverse cross section for the passage of light into the hollow arrow through said opening in the shell shutter element in certain positions of rotation of said shell shutter element and having other apertures on a different transverse cross section for the passage of light into the hollow arrow through said opening in the shell shutter element in a different transverse position of said drum shutter element and in different positions of rotation of said shell shutter element, a lamp within said drum, means for limiting pivoting of said shell shutter element for the opening in said shell shutter element to align with the openings in said drum shutter element, and means for pivoting said shell shutter element.

2. A directional signal for vehicles, comprising a casing with a translucent window, a hollow arrow made of translucent material to be internally illuminated and within said casing, a shell shutter element pivotally mounted in said casing and supporting said hollow arrow and having an opening communicating with the interior of said hollow arrow, a drum shutter element within said shell shutter element for cooperation with each other to produce a shutter action and slidably supported coaxially with the axis of pivoting of said shell shutter element and having apertures upon one transverse cross section for the passage of light into the hollow arrow through said opening in the shell shutter element in certain positions of rotation of said shell shutter element and having other apertures on a different transverse cross section for the passage of light into the hollow arrow through said opening in the shell shutter element in a different transverse position of said drum shutter element and in different positions of rotation of said shell shutter element, a lamp within said drum, means for limiting pivoting of said shell shutter element for the opening in said shell shutter element to align with the openings in said drum shutter element, means for pivoting said shell shutter element, and said means for limiting pivoting comprising cooperating means on said shell shutter element and drum shutter element for limiting pivoting of the shell shutter element to align the opening in the shell shutter element with certain of the openings in the drum shutter element in one transverse position of the drum shutter element, and limiting pivoting of the shell shutter element to align the opening in the shell shutter element with the other of the openings in the drum shutter element in the other transverse position of the drum shutter element.

3. A directional signal for vehicles, comprising a casing with a translucent window, a hollow arrow made of translucent material to be internally illuminated and within said casing, a shell shutter element pivotally mounted in said casing and supporting said hollow arrow and having an opening communicating with the interior of said hollow arrow, a drum shutter element within said shell shutter element for cooperation with each other to produce a shutter action and slidably supported coaxially with the axis of pivoting of said shell shutter element and having apertures upon one transverse cross section for the passage of light into the hollow arrow through said opening in the shell shutter element in certain positions of rotation of said shell shutter element and having other apertures on a different transverse cross section for the passage of light into the hollow arrow through said opening in the shell shutter element in a different transverse position of said drum shutter element and in different positions of rotation of said shell shutter element, a lamp within said drum, means for limiting pivoting of said shell shutter element for the opening in said shell shutter element to align with the openings in said drum shutter element, and means for pivoting said shell shutter element, said drum shutter element being supported on axial pins slidably engaging axial elements on the shell shutter element to accomplish its slidable supporting.

4. A directional signal for vehicles, comprising a casing with a translucent window, a hollow arrow made of translucent material to be internally illuminated and within said casing, a shell shutter element pivotally mounted in said casing and supporting said hollow arrow and having an opening communicating with the interior of said hollow arrow, a drum shutter element within said shell shutter element for cooperation with each other to produce a shutter action and slidably supported coaxially with the axis of pivoting of said shell shutter element and having apertures upon one transverse cross section, for the passage of light into the hollow arrow through said opening in the shell shutter element in certain positions of rotation of said shell shutter element and having other apertures on a different transverse cross section for the passage of light into the hollow arrow through said opening in the shell shutter element in a different transverse position of said drum shutter element and in different positions of rotation of said shell shutter element, a lamp within said drum, means for limiting pivoting of said shell shutter element for the opening in said shell shutter element to align with the openings in said drum shutter element, and means for pivoting said shell shutter element, a stationary member, said drum being provided with a slot engaging said stationary member to limit motion of the drum to sliding only.

5. A directional signal for vehicles, comprising a casing with a translucent window, a hollow arrow made of translucent material to be internally illuminated and within said casing, a shell shutter element pivotally mounted in said casing and supporting said hollow arrow and having an opening communicating with the interior of said hollow arrow, a drum shutter element within said shell shutter element for cooperation with each other to produce a shutter action and slidably supported coaxially with the axis of pivoting of said shell shutter element and having apertures upon one transverse cross section for the passage of light into the hollow arrow through said opening in the shell shutter element in certain positions of rotation of said shell shutter element and having other apertures on a different transverse cross section for the passage of light into the hollow arrow through said opening in the shell shutter element in a different transverse position of said drum shutter element and in different positions of rotation of said shell shutter element, a lamp within said drum, means for limiting pivoting of said shell shutter element for the opening in said shell shutter element to align with the openings in said drum shutter element, means for pivoting said shell shutter element, and said means for limiting pivoting comprising cooperating means on said shell shutter element and drum shutter element for limiting pivoting of the shell shutter element to align the opening in the shell shutter element with certain of the openings in the drum shutter element in one transverse position of the drum shutter element, and limiting pivoting of the shell shutter element to align the opening in the shell shutter element with the other of the openings in the drum shutter element in the other transverse position of the drum shutter element, comprising pegs projecting from said drum shutter element and engaging arcuate slots in the shell shutter element in one transverse position of the drum shutter element and engaging other arcuate slots in the shell shutter element in the other transverse position of the drum shell element.

HARRY L. GEBLER.